March 24, 1936.     H. GALLUSSER     2,035,228
AUTOMATIC DOUBLE ACTING TAKE-UP DEVICE FOR BRAKE SYSTEMS
Filed April 17, 1934     2 Sheets-Sheet 1
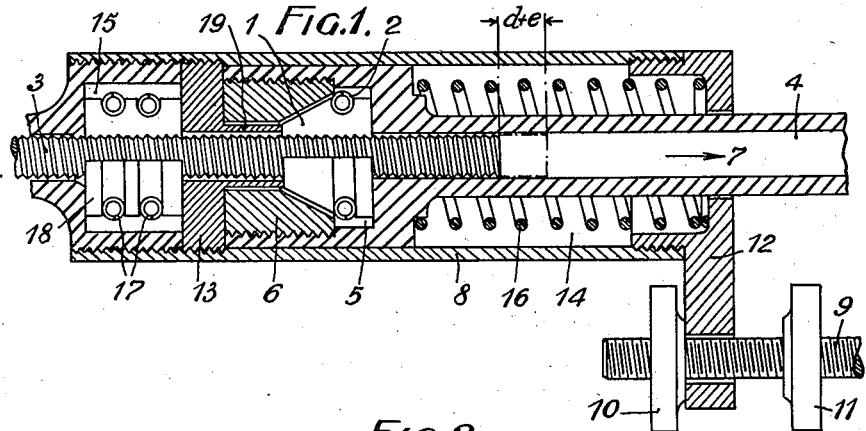
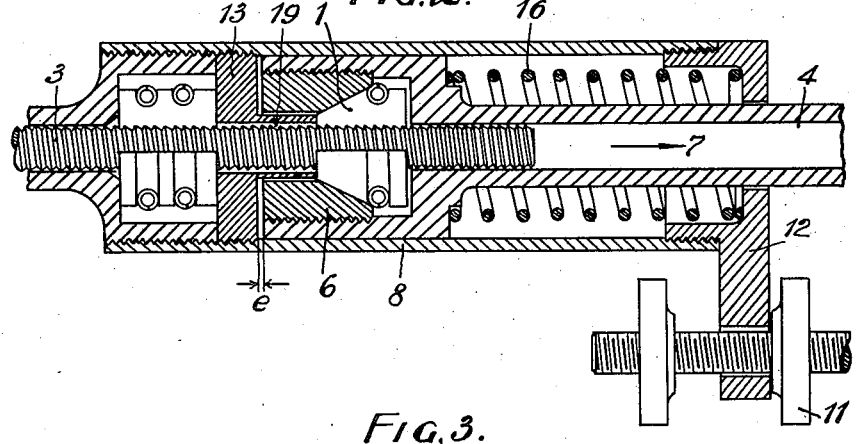
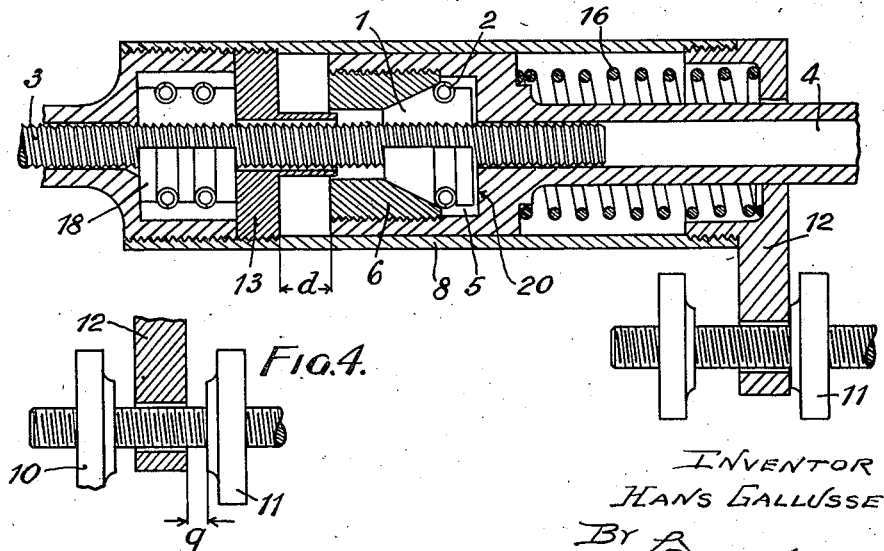
INVENTOR
HANS GALLUSSER
BY
ATTORNEYS.

March 24, 1936.    H. GALLUSSER    2,035,228
AUTOMATIC DOUBLE ACTING TAKE-UP DEVICE FOR BRAKE SYSTEMS
Filed April 17, 1934    2 Sheets-Sheet 2
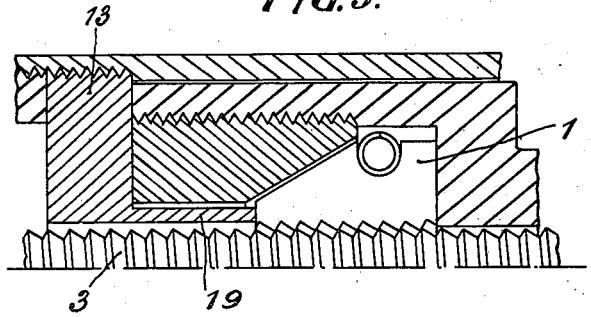
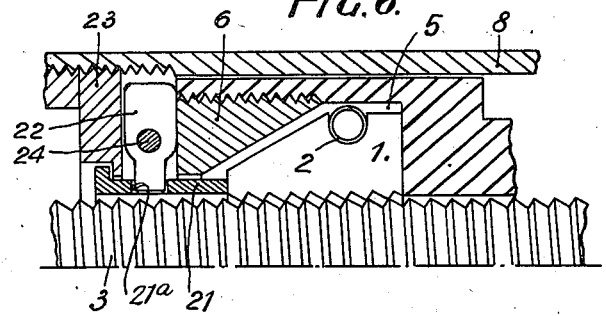
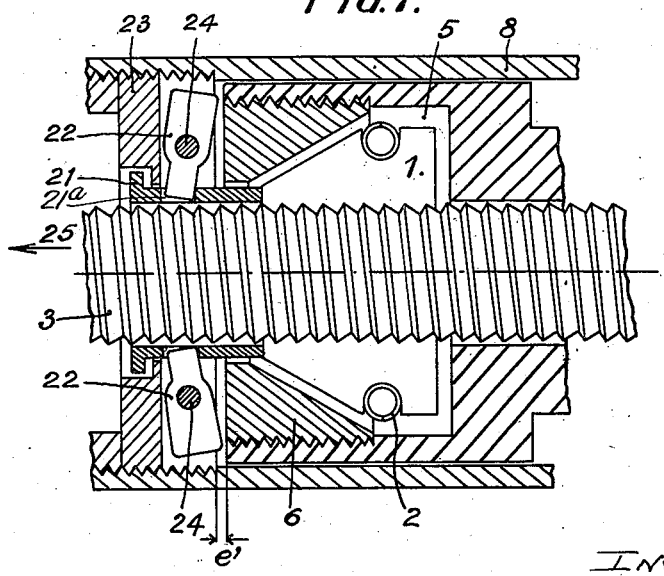
INVENTOR
HANS GALLUSSER
BY
ATTORNEYS Patented Mar. 24, 1936

2,035,228

UNITED STATES PATENT OFFICE 2,035,228

AUTOMATIC DOUBLE-ACTING TAKE-UP DEVICE FOR BRAKE SYSTEMS

Hans Gallusser, Geneva, Switzerland

Application April 17, 1934, Serial No. 720,950
In Germany February 21, 1934

2 Claims. (Cl. 188—200)

The invention relates to an automatic double acting device for taking up the play which develops in brake systems, in particular in railway vehicles. As such is meant a device which brings the brake, both in the case of too much play and in the case of too little play between the brake members and the members to be braked, back to a predetermined, normal play.

The working principle of such devices is already known, but working security is lacking in the existing arrangements, not only because the known devices make use of a great number of springs, particularly cylindrical spiral springs, a member which always diminishes the reliability of a mechanism and which must absolutely be avoided, but, and chiefly because of the difficulty resulting from the fact that the coupling members working together in the known way with a threaded bar possess no constraining guiding device, whereby they can effect the coupling action only, if they are in efficient connection with the threading.

According to the invention, on the one hand a conical coupling member of existing type and on the other hand a second cylindrical member are used and both of these are formed by a clamping member consisting of several parts held together, in the way already specified, by very reliable circular springs. Further simple means are provided, whereby the principal conical coupling member, i. e. the one that transmits the entire braking effort, can be clamped only, if it occupies a proper position relatively to the threading of the bar.

The drawings show, by way of example, an acceptable form of the invention.

Figs. 1 to 3 are longitudinal sections showing the device in three different positions.

Fig. 4 is a detail view illustrating a particular position of a part of the device.

Figs. 5 to 7 are enlarged fragmentary sections showing how a bad coupling may occur and how, according to the invention, the same is remedied.

The principal coupling member consists of a coupling member 1 of existing form, and consisting of several parts, the whole being provided with an outer conical surface and the parts being yieldingly held together by a spring ring 2. This member 1 serves for the coupling together of a toothed rod illustrated in the form of a threaded rod and a traction rod shown in the form of a hollow rod 4, which, for this purpose, terminates in a chamber 5 with a conical seating member 6, to the traction, so that a tractive effort, in the direction of the arrow 7, effects a solid coupling of the two rods which serve for the transmission of the braking effort.

A cylinder or casing 8 encloses the whole and includes a movable arm 12 adapted to move between two abutments 10, 11 adjustable on a fixed threaded rod 9, said cylinder 8 being further divided by a partition wall 13 into two cylindrical chambers 14, 15, the first of which contains a strong cylindrical spiral spring 16 and the second a cylindrical coupling member 18 formed in several parts held together by two spring rings 17, and motionless with regard to the cylinder 8. The partition wall 13 is formed with a tubular sleeve 19 extending right into the chamber 5.

The device works as follows:

When the play between the brake members is normal, the braking is effected by traction in the direction of the arrow 7, and the whole device is displaced from the position according to Fig. 1 into that according to Fig. 2. At the end of this movement, when the arm 12 comes to rest against the abutment 11, there occurs a slight separation $e$ between the seating member 6 and the partition wall 13, until the tubular sleeve 19 allows the application of the principal coupling member 1 against the conical seating member 6. When the brake is released, the whole returns to the position according to Fig. 1. During this operation, the arm 12 has moved to an extent corresponding exactly with the intermediate space between the abutments 10 and 11.

When the play of the brake-members is too great, there still does not occur, in the position according to Fig. 2, any braking and the tractive effort must be continued until the position according to Fig. 3 is reached. Between the cylinder 8 held back by the abutment 11 and the seating member 6 there consequently occurs a relative axial displacement $d$, corresponding to the space $e$ and the excess of play of the brake-members. The bar 3 is correspondingly drawn along and is moved relative to the coupling member 18. When the brake is released the whole under the influence of the spring 16 returns to the position according to Fig. 1, the bar 3 being held back by the coupling member 18, with the bar 4, however, travelling over the greater distance, by sliding with the principal coupling member 1 applied against the flat abutment 20 and to an extent $d+e$ over the threaded rod 3, whose working length is diminished by an amount corresponding to the necessary play to be taken up.

When the play of the brake members is too small, the rod 3 is held back by the engagement of the brake members with the wheels or their equivalent to be braked, while the arm 12 occupies the position according to Fig. 4. A further tractive effort on the rod 4 results in the cylinder 8 being displaced with it to an extent $q$, without any compression of the spring 16 taking place, the coupling members 1 and 18 at the same time sliding over the rod 3 and operation which is made possible through the tubular sleeve 19 preventing the engagement of the coupling member with the conical seat of the seating member 6. This displacement corresponds to an extension of the rigging to an extent $q$ it being understood that the friction ratios between the two coupling members 1 and 18 and the bar 3 are so predetermined that the force for withdrawing the bar 3 is less than the pressure tension of the spring 16. The subsequent braking and releasing of the brake are effected as already described.

During all these taking up operations, it is desirable that the principal coupling member, the entire braking effort transmitting member 1, be in efficient connection with the threading 3, which however is not always the case. Fig. 5 shows an inefficient connection, occurring frequently, in which the principal coupling member 1 lies on the edges of the threading and, through the tubular sleeve 19, is prevented from engaging the conical seat of the seating member 6 and accordingly is not properly seated in or connected with the threads of the rod 3. Were the brake, in such a case, to be applied abruptly, then the edges of the threading bearing all the effort, would easily be torn away, and even, through the speed obtained, there may occur a sliding of the coupling member over the following threads, whereby the entire device is thus rendered useless.

According to the invention the tubular sleeve 19, as shown in Figs. 6 and 7 is replaced by an axially movable sleeve 21, which is connected to the partition wall 23 of the cylinder 8 by levers 22 projecting into axial slits 21ª of the sleeve 21 and adapted to turn on pivots 24 in the said partition wall bored to accommodate the same.

When the end of the rod 4 having the chamber 5 and the partition wall 23 are applied close together, the seating member 6 prevents all the levers 22 from turning, with the result that the sleeve 21 is held fast in a position in which it exactly replaces in its operations the tube 19 (see Fig. 6).

As has already been said, there occurs, at every braking, at least a small separation $e$ between the partition wall 23 and the chamber 5. But, as soon as this separation begins, be it only of a very small extent as indicated at $e'$, the levers 22 are set free in such a way that the sleeve 21 can move backwards a little in the direction of the arrow 25 (see Fig. 7).

If the coupling member 1, just before this moment happened to be, in the inefficient position according to Fig. 6, the tightening effort of its spring 2 is then sufficient to properly seat it in the threading 3, simultaneously with a slight displacement of the released sleeve 21 backwards. The conical seating member 6 can consequently in every case act only on a correctly placed coupling member, and that is precisely the object of the invention.

What I claim is:—

1. An automatic double-acting take-up device for brake systems of vehicles, comprising a casing, a traction rod, a spring positioned between said casing and traction rod through which spring the latter is adapted to act on said casing, a toothed rod, a coupling member carried by said toothed rod in motionless relation thereto for connecting said rods with each other, a second coupling member carried by said toothed rod, a seating member movable with said traction rod and adapted to control the connection of said second coupling member with said toothed rod, and abutment means associated with said casing and adapted, in the position of rest of the brake system, to prevent engagement between the second coupling member and the seating member, said abutment means being relatively movable after tractive effort has been initially applied to said traction rod to permit said second coupling member to engage said toothed rod in properly seated relation thereto.

2. An automatic double-acting take-up device for brake systems of vehicles, comprising a casing, a traction rod, a spring positioned between said casing and traction rod through which spring the latter is adapted to act on said casing, a toothed rod, a coupling member carried by said toothed rod in motionless relation thereto for connecting said rods with each other, a second coupling member carried by said toothed rod, a seating member movable with said traction rod and adapted to control the connection of said second coupling member with said toothed rod, and abutment means associated with said casing and adapted, in the position of rest of the brake system, to prevent engagement between the second coupling member and the seating member, said abutment means being relatively movable after tractive effort has been initially applied to said traction rod to permit said second coupling member to engage said toothed rod in properly seated relation thereto, said abutment means consisting of a sleeve surrounding said toothed rod and provided with longitudinal slits, and double levers pivotally mounted on said casing with their inner ends located in said slits, and having their outer ends arranged to engage said seating member whereby movement of said sleeve is prevented in said position of rest.

HANS GALLUSSER.